Jan. 10, 1939.  T. HARRIS  2,143,693
PROPELLER SHAFT PROTECTOR
Filed April 6, 1938   2 Sheets-Sheet 1
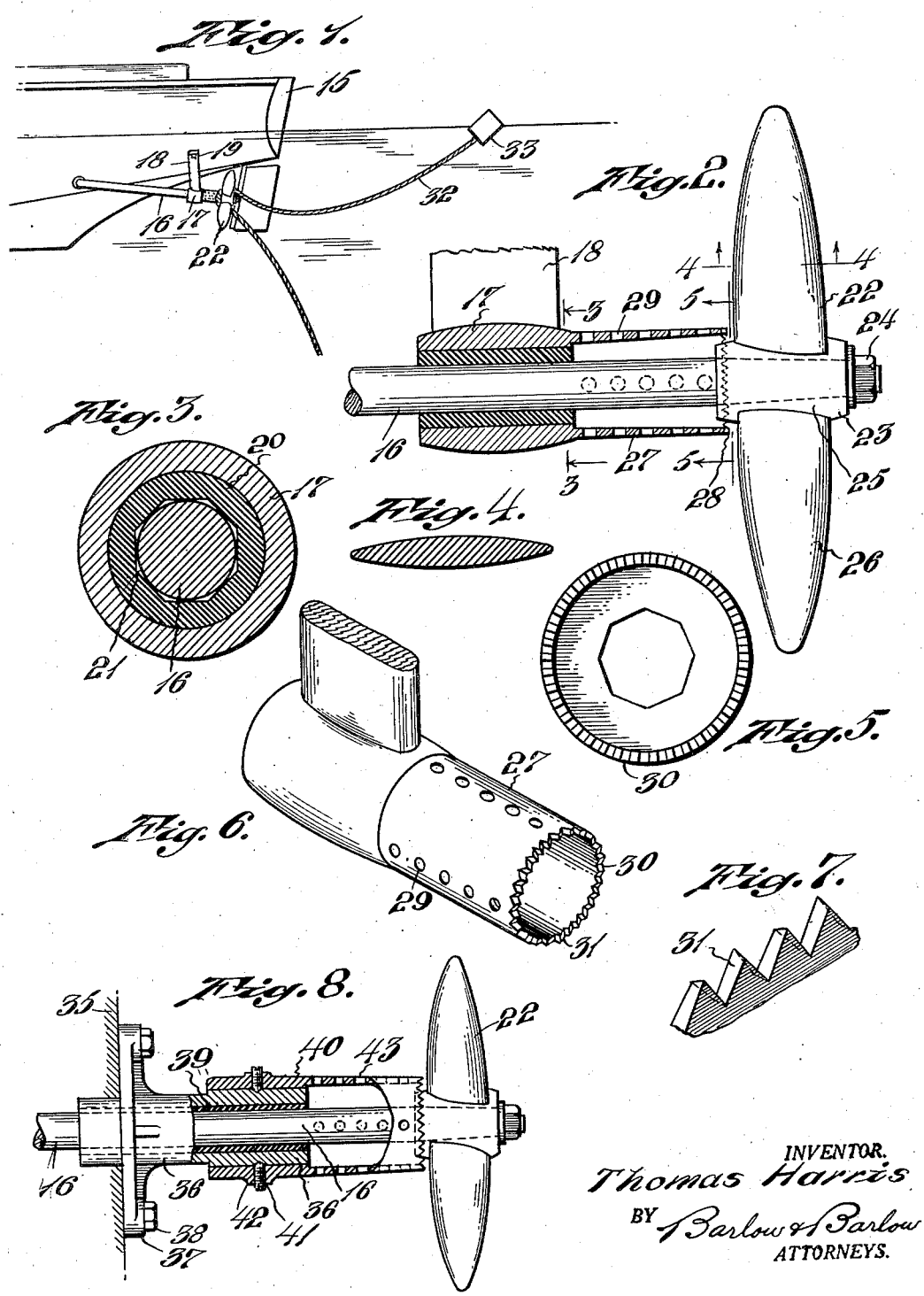
INVENTOR.
Thomas Harris
BY Barlow & Barlow
ATTORNEYS.

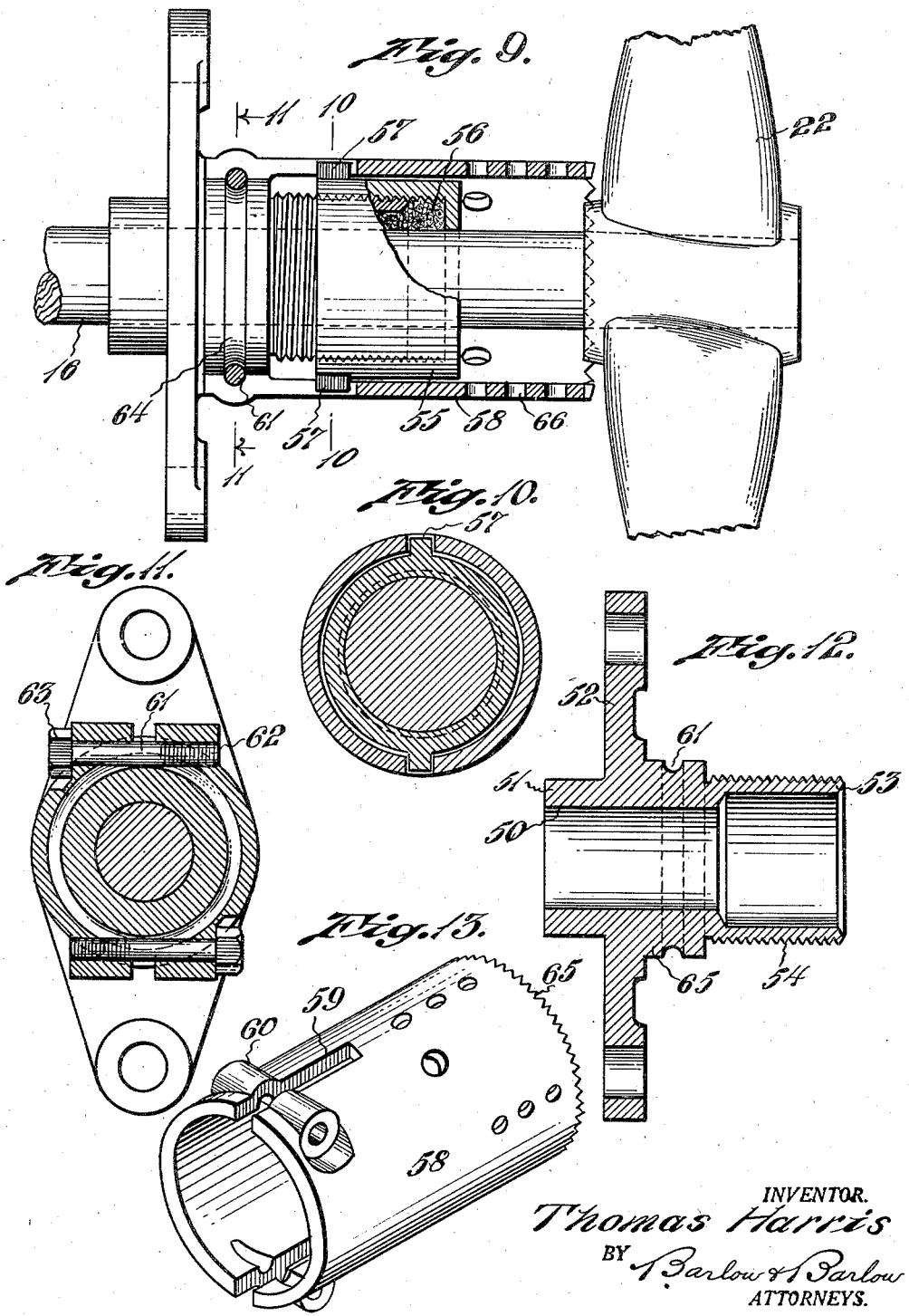

Patented Jan. 10, 1939

2,143,693

UNITED STATES PATENT OFFICE 2,143,693

PROPELLER SHAFT PROTECTOR

Thomas Harris, Providence, R. I.

Application April 6, 1938, Serial No. 200,414

5 Claims. (Cl. 115—40)

This invention relates to a ship's propeller shaft, strut bearings, stuffing boxes and the like; and has for its primary object to provide a device which will prevent a rope or the like from damaging a propeller shaft and bearing therefor.

Another object of the invention is to prevent the burning out of a bearing for the propeller shaft which might occur by reason of the rope winding tightly about the shaft and choking off circulation of water through the bearing.

Another object of the invention is to provide a means for preventing a rope which may be wound about a propeller shaft from building up sufficiently to cause a pressure which will bend the shaft or damage the bearing.

Another object of the invention is to provide for cutting any rope which may tend to jam or foul the propeller before the rope has a chance to do any damage to the propeller shaft.

A further object of the invention is to so guard the propeller shaft as to keep the rope spaced from the shaft that the shaft may rotate freely and permit water to have free circulation with the shaft bearing notwithstanding the fact that the rope may be temporarily wound about the guard.

With these and other objects in view, the invention consists of certain novel features of construction, as will be more fully described, and particularly pointed out in the appended claims.

In the accompanying drawings:

Fig. 1 is a side elevation illustrating a fragmental portion of a ship with the propeller engaging a rope;

Fig. 2 is a sectional view through a propeller shaft strut bearing;

Fig. 3 is a section on substantially line 3—3 of Fig. 2;

Fig. 4 is a section on substantially line 4—4 of Fig. 2;

Fig. 5 is a view taken on substantially line 5—5 of Fig. 2 and showing the end of the collar adjacent the propeller blade;

Fig. 6 is a perspective view of the bearing with a fragmental part of a strut extending therefrom and also showing the collar which is the subject of this invention;

Fig. 7 is an enlarged fragmental detail of the saw tooth edge of the collar;

Fig. 8 is a side elevation partly broken away and in section of a differently arranged propeller shaft mounting projecting from the deadwood of a boat or ship;

Fig. 9 is a side elevation partly in section and showing the propeller fragmentally combined with a cutter collar and stuffing box;

Fig. 10 is a section on line 10—10 of Fig. 9;

Fig. 11 is a section on line 11—11 of Fig. 9;

Fig. 12 is a sectional view of the fixed portion of the stuffing box;

Fig. 13 is a perspective view of my collar which slidably engages the rotatable portion of the stuffing box and rotatably engages the fixed portion.

The propeller shaft and propeller at the end thereof on ships and especially on small boats are frequently fouled by engagement with some rope or the like which entangles the propeller and winds upon the propeller shaft to suffocate or block off circulation through the bearing which supports the propeller shaft and also builds up between the propeller and its bearing sufficiently to exert such pressure upon the propeller as to bend or spring the shaft and if continued to run will burn out the bearing for the propeller shaft. Often the location at which such fouling occurs makes freeing of the propeller shaft extremely difficult as usually a man must go overboard and cut the rope from the shaft in order to free the same; and as such propellers are usually several feet below the surface of the water, work of this character is difficult and dangerous; and in order to avoid such undesirable occurrences I have provided a collar to space a rope from the shaft, which collar will cut the rope to prevent any pressure being exerted on the propeller and in turn on the shaft; and the following is a more detailed description of the present embodiment of this invention, illustrating the preferred means by which these advantageous results may be accomplished:

With reference to the drawings, 15 designates the stern of a boat and 16 a propeller shaft projecting through the bottom of the boat and supported in the bearing 17 at the end of a strut 18 suitably bolted to the bottom of the boat as at 19. This bearing 17 is bushed as at 20 with a rubber bushing of octagonal shape so as to leave spaces 21 between it and the round shaft 16 for the circulation of water therethrough, which occurs as the shaft is running and which if choked off by reason of being blocked by a rope tightly wound about the shaft and between the end of the bearing and the propeller hub will cause the bearing to heat and become "burned out."

The propeller is designated 22 and consists of a hub 23 keyed to the end of the shaft 16 and held thereon by a nut 24. There is usually a taper 25 on the end of the shaft with a corresponding taper in the bore of the hub of the propeller so that these two fit snugly together and are limited as to axial movement. The blades of the propellers extending from the hub are designated 26.

A sleeve 27 which may be cast integral with the bearing 17 extends therefrom in spaced relation to the shaft, as shown in Fig. 2, to a location in close proximity to the path of rotation of the propeller blade as at 28. This sleeve is perforated as at 29 so as to permit free circulation of water through it and through the bearing 20 for lubricating the shaft which extends through the bearing. The edge 30 of this sleeve is provided with some suitable cutting edge, such for instance as saw teeth 31, so that should a rope 32 of a lobster pot buoy 33, as indicated in Fig. 1, engage the propeller, as shown in Fig. 1, and the rotation of the blades of the propeller tend to wind the rope 32 about the shaft, this rope would be spaced from the shaft as wound and would be severed by being drawn into engagement with the cutting edge 30 and thus prevent any binding action or building up of the rope so as to cause sufficient pressure to spring the shaft or bend the propeller blades or so tightly bind about the shaft as to prevent circulation of water through the bearing.

While I have illustrated the collar 27 as formed integral with the bearing 17 it will be readily apparent that this collar might be made separate from the bearing 17 and secured thereto in some suitable manner.

In Fig. 8 I have illustrated a somewhat different form of structure in which the deadwood of the boat is indicated at 35, the propeller shaft 16 extending through the deadwood 35 and through a bearing 36 having a flange 37 thereon to be bolted as at 38 to the deadwood of the boat. This bearing has a bushing 39 with an octagonal bore for lubrication, while a stuffing box is usually located closer to the engine to be accessible from the inside of the boat. In this case the collar 40 is separate but has a close fit with the bearing 36 to be secured thereto by screws 41 extending through bosses 42 in the collar. This collar 40 of course is provided with openings 43 for the circulation of water therethrough and a cutting edge adjacent the propeller.

In the modification shown in Fig. 9 propeller shaft 16 is shown as passing through the bore 50 of the bearing 51 which is provided with a flange 52 to be secured from outside to the deadwood of the boat. This bearing has cast integral therewith a cup 53 of the stuffing box which is externally threaded as at 54 for the reception of the outside cup portion 55 which is internally threaded to fit therewith. Packing 56 is provided between the cup and about the shaft which is held in firm engagement with the shaft by turning up of the cup 55 on the thread 54. This cup 55 has a pair of lugs 57 extending radially outwardly thereof. A collar 58 is slotted as at 59 to receive these lugs 57 so that when the collar is rotated the cup 55 will be rotated to take up upon the packing 56. Collar 58 is provided with bosses 60 for the reception of bolts 61 which are threaded as at 62 into one of the bosses while the bolt has a head 63 engaging the other boss so that when turned the collar is contracted. The bolt 61 in extending as a cord across the cylindrical opening of the collar, fits into a circular groove 64 in the hub portion 65 of the bearing 51 so that when the collar is loosened it may be rotated about this hub 65 while maintaining its position thereon, in which case the outer cup portion of the stuffing box will be rotated to loosen up or take up upon the packing 56, as may be desired, and after the packing is sufficiently squeezed so that no leak will occur the bolts 61 will be tightened to hold the collar in place, and likewise retain the packing cup 55 in place.

This collar 58 is provided with a cutting edge 65 similar to the cutting edge 30 of the collar previously described, and is also provided with openings 66 for the circulation of water therethrough. This collar performs the same function as previously described in conjunction with the propeller 22 which it is closely adjacent to. By reason of the fact that the collar, although it rotates, does not move inwardly with the outer cup 55 of the packing box, the collar maintains a fixed distance from the propeller shaft at all times.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination, a propeller shaft, a stuffing box about the same having a fixed part and a rotatable take-up part, a propeller on said shaft, a collar provided with a cutting edge at one end concentric with and spaced from said shaft having engagement with said take-up part, and means for holding said collar against movement and with it said take-up part.

2. In combination, a propeller shaft, a stuffing box about the same having a fixed part and in one rotatable take-up part, a propeller on said shaft, a collar provided with a cutting edge at one end and concentric with and spaced from said shaft and having rotatable engagement with said fixed part and slidable engagement with said take-up part and rotatable therewith and located with one end adjacent the path of said propeller, and means for binding said collar on said fixed part to hold it and the take-up part against movement.

3. In combination with a propeller shaft and a propeller thereon, a device for protecting said shaft and propeller, comprising a propeller shaft bearing adapted to support said shaft and having a tubular collar extending therefrom and in close proximity to the path of rotation of said propeller, the end face of said collar adjacent the path of rotation of said propeller having a cutting edge constructed and arranged to cut a rope or the like coming in contact therewith.

4. The combination as defined in claim 3 in which said cutting edge is saw like.

5. The combination as defined in claim 3 in which said collar has apertures therealong to admit water to said shaft and bearing between the propeller and bearing.

THOMAS HARRIS.